US012584561B2

(12) United States Patent
Ouchi

(10) Patent No.: US 12,584,561 B2
(45) Date of Patent: Mar. 24, 2026

(54) DISTRIBUTION VALVE

(71) Applicant: NORITZ CORPORATION, Hyogo (JP)

(72) Inventor: Ryoji Ouchi, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 42 days.

(21) Appl. No.: 18/912,618

(22) Filed: Oct. 11, 2024

(65) Prior Publication Data

US 2025/0129860 A1 Apr. 24, 2025

(30) Foreign Application Priority Data

Oct. 23, 2023 (JP) ................................. 2023-181621

(51) Int. Cl.
| | |
|---|---|
| *F16K 11/085* | (2006.01) |
| *F16K 5/18* | (2006.01) |
| *F16K 31/04* | (2006.01) |

(52) U.S. Cl.
CPC .......... *F16K 11/0856* (2013.01); *F16K 5/188* (2013.01); *F16K 31/041* (2013.01)

(58) Field of Classification Search
CPC ............................. F16K 5/188; F16K 11/0856
USPC ........................................................ 251/172
See application file for complete search history.

(56) References Cited

U.S. PATENT DOCUMENTS

| | | | | |
|---|---|---|---|---|
| 2,628,060 A | * | 2/1953 | Parker ................... | F16K 5/0414 |
| | | | | 251/174 |
| 3,021,869 A | * | 2/1962 | Ross ....................... | F15B 13/04 |
| | | | | 137/625.24 |
| 3,506,239 A | * | 4/1970 | Johnson .................... | F16K 5/04 |
| | | | | 251/367 |
| 3,913,612 A | * | 10/1975 | Tolnai ................... | F16K 5/0471 |
| | | | | 137/454.6 |
| 3,923,284 A | * | 12/1975 | Stickler ..................... | F16K 3/10 |
| | | | | 251/175 |
| 4,088,302 A | * | 5/1978 | Williams ................. | F16K 3/04 |
| | | | | 251/368 |
| 4,557,464 A | * | 12/1985 | Gyurovits ................. | F16K 3/08 |
| | | | | 251/312 |

(Continued)

FOREIGN PATENT DOCUMENTS

| | | |
|---|---|---|
| JP | S6324461 | 2/1988 |
| JP | 2009228764 | 10/2009 |

*Primary Examiner* — Kevin F Murphy
(74) *Attorney, Agent, or Firm* — JCIPRNET

(57) ABSTRACT

A distribution valve includes a cylindrical valve body rotatably fitted into a valve main body having a first outlet, a second outlet, and an inlet, and a driver for rotating the valve body, and the distribution valve distributes fluid flowing from the inlet into the valve body to the first and second outlets. The valve body has a peripheral wall portion and a bottom surface portion that function as seal surface portions to close the first and second outlets and the inlet. The peripheral wall portion is formed with first and second opening portions configured to continuously change opening areas of the first and second outlets. The bottom surface portion is formed with a third opening portion configured to change an opening area of the inlet within a predetermined range. A valve seat member is arranged in the inlet, causing a seal portion to adhere to the bottom surface portion.

2 Claims, 5 Drawing Sheets

(56)                    References Cited

U.S. PATENT DOCUMENTS 4,733,694 A  *   3/1988  Knapp ................ F16K 11/0782
                                                  251/174

* cited by examiner

DISTRIBUTION VALVE

CROSS-REFERENCE TO RELATED APPLICATIONS

This application claims the priority benefit of Japan Application No. 2023-181621, filed on Oct. 23, 2023. The entirety of the above-described patent application is hereby incorporated by reference herein and made a part of the present specification.

BACKGROUND

Technical Field

The disclosure relates to a distribution valve that controls the distribution of fluid, and particularly relates to a distribution valve that adjusts the distribution ratio and total flow rate of fluid while also including a closing function to set the total flow rate to zero.

Description of Related Art

Conventionally, hot water supply devices have been utilized that heat low-temperature tap water in a heating portion, and adjust the temperature by mixing this heated high-temperature water with tap water to provide hot water. The hot water supply device controls the heating capacity in the heating portion to adjust the temperature of the high-temperature water, and also adjusts the mixing ratio of high-temperature water and tap water to regulate the temperature of the hot water supply.

For example, Patent Document 1 (Japanese Utility Model Application Laid-Open Publication No. S63-24461) describes a manual water mixing faucet configured to adjust the mixing ratio of high-temperature water and tap water by rotating a valve body to adjust the opening degrees of two inlet ports corresponding to high-temperature water and tap water. Further, Patent Document 2 (Japanese Patent Application Laid-Open (JP-A) No. 2009-228764) describes a flow rate adjustment valve (mixing valve) configured to adjust the mixing ratio of high-temperature water and tap water by rotating a cylindrical valve body using a stepping motor to adjust the opening degrees of two inlet ports for high-temperature water and tap water.

On the other hand, there is a type of hot water supply device that distributes tap water to a heating portion and a bypass passage that bypasses this heating portion using a distribution valve, and mixes high-temperature water from the heating portion with tap water from the bypass passage to supply hot water. In such a hot water supply device, the mixing ratio of high-temperature water and tap water is adjusted by adjusting the distribution ratio in the distribution valve. For example, the mixing valve of Patent Document 2 may be used as a distribution valve by reversing the fluid flow direction, namely by making the two inlet ports into outlet ports and making the outlet port for mixed hot water into an inlet port for tap water.

The hot water supply device is provided with sufficient heating capacity for hot water supply at around 40° C., which is often used in normal cases. However, in the case of supplying high-temperature hot water set at around 60° C. by heating low-temperature tap water of about 5° C., which requires a large heating capacity, there may be insufficient heating capacity due to the large hot water supply flow rate. In such cases, all tap water is supplied to the heating portion, and the insufficient heating capacity is compensated for by reducing the flow rate of tap water provided to the hot water supply device, thereby supplying hot water at the set temperature.

However, mixing valves or distribution valves with reversed flow direction, such as the water mixing faucet in Patent Document 1 and the mixing valve in Patent Document 2, do not include a function to adjust the total flow rate of the mixed hot water. Thus, in hot water supply devices that mix high-temperature water and low-temperature water using a mixing valve or distribution valve, it is common to reduce the flow rate of tap water provided to the hot water supply device by adjusting a flow rate adjustment valve provided, for example, downstream of the mixing valve or distribution valve to restrict the hot water supply flow rate.

In addition, in facilities where large amounts of hot water may be used at once, such as accommodation facilities or hospitals, a linked hot water supply system composed of a plurality of connected hot water supply devices is used to accommodate large flow rate hot water supply. The linked hot water supply system supplies hot water by changing the number of operating hot water supply devices according to the required heating capacity. In this case, each hot water supply device is equipped with, for example, a stop valve at the tap water inlet, and the stop valve of the hot water supply device that is not operated is closed, thereby changing the number of operating units by opening and closing the stop valves. Since unheated hot water does not flow out from the hot water supply devices that are not operated, it is possible to supply hot water at the set temperature.

In a linked hot water supply system composed of hot water supply devices using distribution valves, it is necessary to arrange a stop valve upstream of the distribution valve and a flow rate adjustment valve downstream of the distribution valve, resulting in a complex structure and control of the hot water supply device, which calls for improvement. Thus, it is being considered to add a flow rate adjustment function and a closing function that operate in conjunction with the adjustment of the distribution ratio by providing a flow rate adjustment mechanism and a closing mechanism at the inlet (inflow port) of the distribution valve.

For example, the flow rate adjustment function and closing function are added by opening and closing the bottom portion of the valve body of the mixing valve in Patent Document 2 by rotating the valve body. However, even if the inlet is closed, tap water flows into the seal portion due to the supply pressure of the tap water, causing leakage, and it was difficult to reduce the total flow rate to zero, especially in the case of high tap water pressure. Further, as the distribution ratio adjustment, flow rate adjustment, and closing are repeated, the seal portion wears out, making it easier for gaps to form through which tap water could flow even when the inlet is closed.

The disclosure provides a distribution valve configured to adjust the distribution ratio and total flow rate of fluid, as well as suppress leakage when the total flow rate is set to zero.

SUMMARY

The distribution valve of the disclosure according to one aspect includes: a valve main body having a first outlet, a second outlet, and an inlet; a cylindrical valve body, rotatably fitted into the valve main body; and a driver, configured to rotate the valve body, wherein the valve body comprises a peripheral wall portion that functions as a sealing surface portion that closes the first outlet and the second outlet, and a bottom surface portion that functions as a sealing surface portion that closes the inlet, the peripheral wall portion is formed with a first opening portion and a second opening portion configured to continuously change an opening area of the first outlet and an opening area of the second outlet by rotation of the valve body, the bottom surface portion is formed with a third opening portion configured to change an opening area of the inlet within a predetermined range by rotation of the valve body, and the distribution valve distributes a fluid flowing into the valve body from the inlet to the first outlet and the second outlet, wherein a valve seat member provided with a seal portion that seals by contacting the bottom surface portion is arranged in the inlet, and the valve seat member is movable in an axial direction of the valve body, and is configured such that the seal portion adheres to the bottom surface portion as the valve seat member is pressed toward the valve body by a supply pressure of fluid acting on the inlet.

According to the aforementioned configuration, the distribution valve distributes fluid introduced from the inlet into the cylindrical valve body to the first outlet and the second outlet, and the inlet is provided with a valve seat member equipped with a seal portion that contacts the bottom surface portion of the valve body. This valve seat member is movable in an axial direction of the valve body and is pressed so that the seal portion adheres to the bottom surface portion of the valve body in response to the supply pressure of the fluid. Thus, when the valve body is rotated to close the inlet, the seal portion of the valve seat member adheres to the bottom surface portion of the valve body to prevent leakage and stop water flow. Further, the valve seat member may move to compensate for wear of the seal portion, enabling the seal portion to adhere to the bottom surface portion of the valve body.

For the distribution valve of the disclosure according to another aspect, in the distribution valve according to the previous aspect, an O-ring is provided on an outer peripheral portion of the valve seat member for sealing between the valve seat member and an inner peripheral surface of the inlet. According to the aforementioned configuration, it is possible to seal the fluid that enters between the inner peripheral surface of the inlet and the valve seat member, enabling the valve seat member to be pressed towards the valve body.

DESCRIPTION OF THE EMBODIMENTS

Hereinafter, the aspects for implementing the disclosure are described based on the embodiments.

According to the distribution valve of the disclosure, it is possible to adjust the distribution ratio and total flow rate of fluid, as well as suppress leakage when setting the total flow rate to zero.

[Embodiment]

Figure 1:
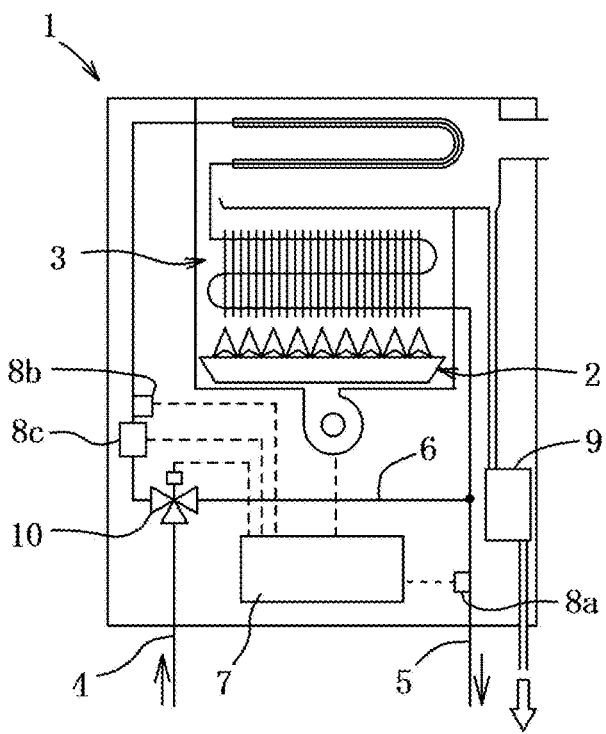
FIG. 1 is a configuration diagram of a hot water supply device provided with a distribution valve.

First, the hot water supply device to which the distribution valve of the disclosure is applied is described. As shown in FIG. 1, the hot water supply device 1 is a combustion-type hot water supply device having a combustion device 2 provided with a burner, a blower fan, etc., and a heat exchanger 3, and is provided with a heating portion that heats tap water in the heat exchanger 3 by utilizing the combustion heat generated in the combustion device 2. This hot water supply device 1 includes a water supply passage 4 that supplies tap water to the heat exchanger 3, a hot water outlet passage 5 that discharges hot water from the heat exchanger 3, a distribution valve 10 interposed in the water supply passage 4, a bypass passage 6 that branches from the water supply passage 4 at the distribution valve 10 and connects to the hot water outlet passage 5, a controller 7 that performs hot water supply control, and the like. The distribution valve 10 distributes the supplied tap water between the heat exchanger 3 side and the bypass passage 6 side that bypasses the heating portion. The heat exchanger 3 includes a latent heat recovery heat exchanger, and the hot water supply device 1 is equipped with a neutralizer 9 that neutralizes and drains strongly acidic condensate water contained in the combustion exhaust.

The hot water outlet passage 5 is equipped with a hot water temperature sensor 8a downstream of the connection portion with the bypass passage 6. The water supply passage 4 is equipped with a water supply temperature sensor 8b and a water supply flow rate sensor 8c downstream of the distribution valve 10. The controller 7 controls the combustion heat generated by the combustion device 2 and the distribution ratio of the distribution valve 10 based on the detected temperature of the water supply temperature sensor 8b and the detected flow rate of the water supply flow rate sensor 8c, so that the detected temperature of the hot water temperature sensor 8a becomes the set hot water temperature. The introduction flow rate (total flow rate) of tap water to the hot water supply device 1 is calculated based on the detected flow rate of the water supply flow rate sensor 8c and the distribution ratio of the distribution valve 10.

The distribution valve 10 is controlled to increase the distribution to the heat exchanger 3 side as the heating capacity required for hot water supply at the set hot water temperature increases. Further, the distribution valve 10 is controlled to reduce the total flow rate or to set the total flow rate to zero as needed.

Figure 2:
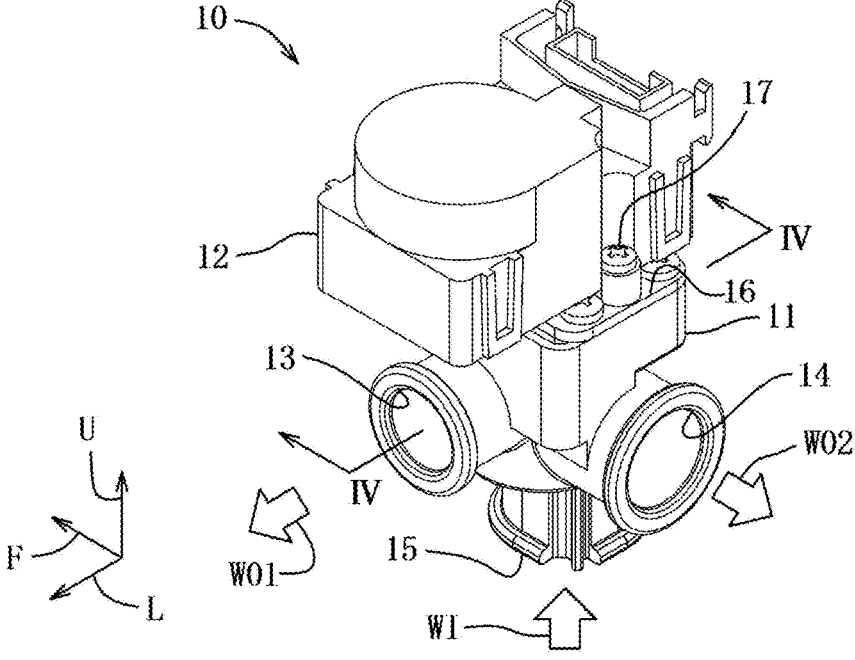
FIG. 2 is a perspective view of a distribution valve according to an embodiment of the disclosure.

Next, the distribution valve 10 is described. As shown in FIG. 2, the distribution valve 10 is equipped with a drive unit 12 (driver) having, for example, a stepping motor on the valve main body 11. Here, the description is based on the distribution valve 10 being equipped in the hot water supply device 1 with the drive unit 12 positioned on the upper side. In the figure, arrow U, arrow F, and arrow L represent the upward, forward, and leftward directions of the distribution valve 10, respectively. It should be noted that the orientation of the distribution valve 10 may be appropriately changed depending on the device to which it is attached.

The valve main body 11 is formed, for example, of synthetic resin and has a first outlet 13 and a second outlet 14 on the side portion thereof, and an inlet 15 on the bottom portion thereof. The drive unit 12 is fixed to the mounting plate 16 on the upper portion of the valve main body 11 by a plurality of fastening members 17. When the distribution valve 10 is interposed in the water supply passage 4, the inlet 15 and the second outlet 14 are connected to the water supply passage 4, and the bypass passage 6 is connected to the first outlet 13. The tap water introduced into the inlet 15 heading upward, as indicated by arrow WI, is distributed into tap water supplied to the bypass passage 6 from the first outlet 13 as indicated by arrow WO1, and tap water supplied to the heat exchanger 3 from the second outlet 14, as indicated by arrow WO2.

Figure 3:
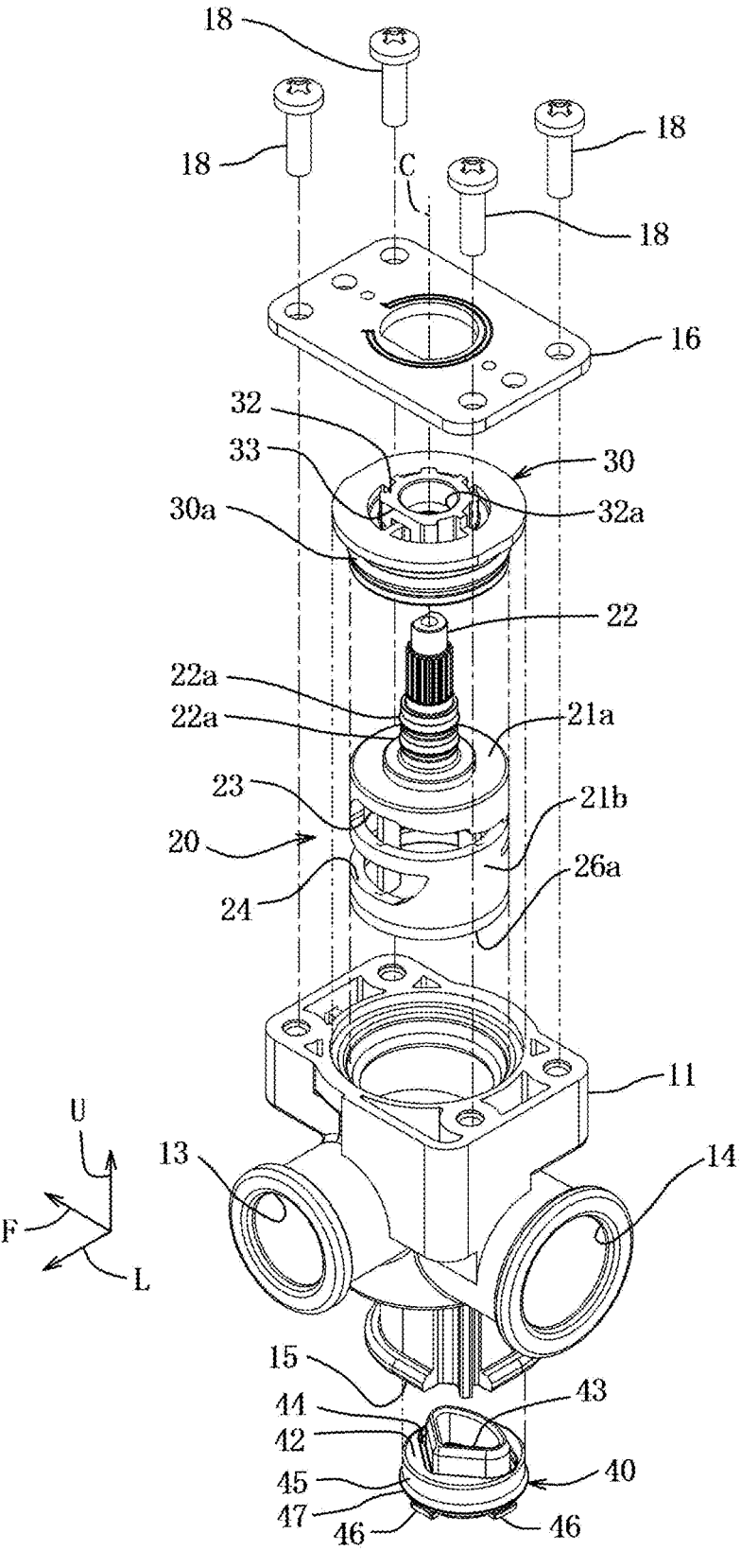
FIG. 3 is an exploded view of main parts of the distribution valve shown in FIG. 2.
Figure 4:
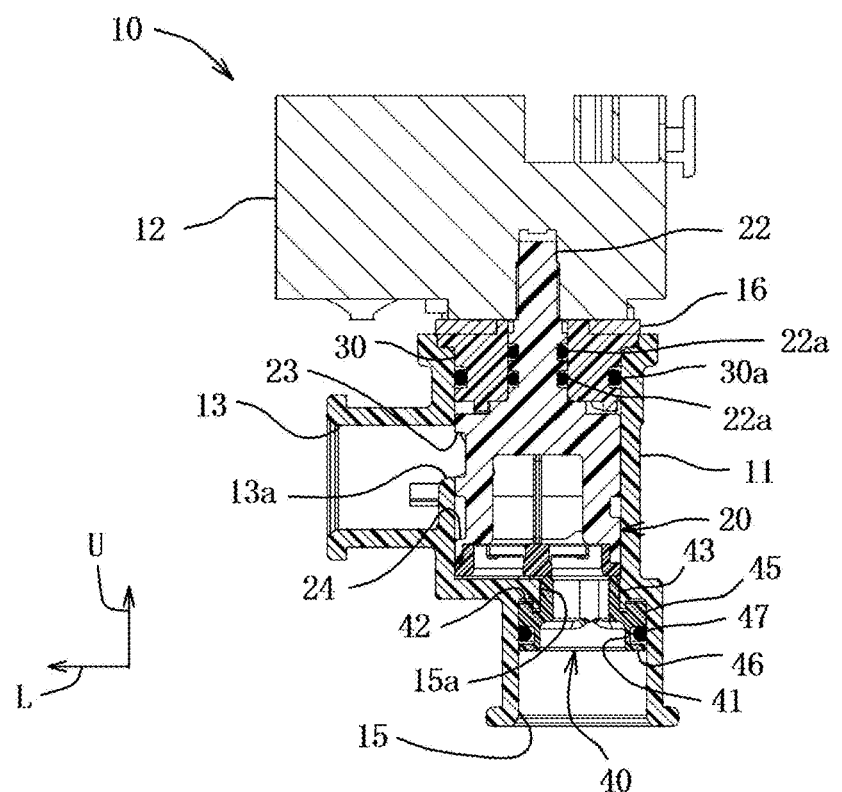
FIG. 4 is a vertical cross-sectional view along the line IV-IV of the distribution valve shown in FIG. 2.

As shown in FIG. 3 and FIG. 4, a cylindrical valve body 20, formed for example of synthetic resin, is fitted rotatably into the cylindrically formed space inside the valve main body 11. A valve shaft 22, concentric with the center axis C of the valve body 20, extends from the top surface portion 21a covering the top surface of the valve body 20 to the outside of the valve main body 11. A collar member 30, which rotatably supports this valve shaft 22, is fitted into the valve main body 11 together with the valve body 20. These valve body 20 and collar member 30 are prevented from falling out of the valve main body 11 by the mounting plate 16, which is fixed to the valve main body 11 with a plurality of fastening members 18. In order to rotationally drive the valve body 20 via the valve shaft 22 by the drive unit 12 fixed to this mounting plate 16, a part of the valve shaft 22 is subjected to serration processing. The internal structure of the drive unit 12 is omitted from the drawings and description.

Two O-rings 22a are fitted on the valve shaft 22 to provide a watertight seal between the valve shaft 22 and the collar member 30. Further, an O-ring 30a is fitted on the outer periphery of the collar member 30 to provide a watertight seal between the collar member 30 and the valve main body 11. A turning regulation portion 33 is formed on the insertion portion 32 of the collar member 30, which is inserted through the mounting plate 16, to engage with the mounting plate 16 and prevent the collar member 30 from rotating along with the rotation of the valve main body 11.

A valve seat member 40 made of synthetic resin is fitted into a connecting portion 15a that communicates with the inlet 15 at the bottom portion of the valve main body 11. The valve seat member 40 includes a cylindrical portion 41 formed in a cylindrical shape, a top surface portion 42, and a seal portion 43 extending from the top surface portion 42 towards the valve body 20 to seal by contacting the bottom surface portion 26a of the valve body 20. A groove 44 is formed on the top surface portion 42 surrounding the outer periphery of the seal portion 43 along the base portion of the seal portion 43. The seal portion 43 is formed in a tubular shape with a substantially fan-shaped opening, and the internal space of the cylindrical valve body 20 may be connected to the inlet 15 through the inner side of the tubular seal portion 43 fitted into the connecting portion 15a and the inner side of the cylindrical portion 41.

Further, the valve seat member 40 has a flange 45 and a plurality of protrusions 46 on the outer periphery of the cylindrical portion 41. The flange 45 is formed to extend radially outward together with the top surface portion 42, protruding from the outer periphery of the cylindrical portion 41. The plurality of protrusions 46 are formed to protrude radially outward from the lower end portion of the cylindrical portion 41 to substantially the same extent as the flange 45. Next, an O-ring 47 is equipped on the outer periphery of the cylindrical portion 41 between the flange 45 and the plurality of protrusions 46 to seal between the inner peripheral surface of the inlet 15. The valve seat member 40 mounted in the inlet 15 is movable in the axial direction of the valve body 20, and the seal portion 43 is pressed to adhere to the bottom surface portion 26a of the valve body 20 by the force received by the flange 45 and the lower surface of the top surface portion 42 from the flowing tap water.

Figure 5:
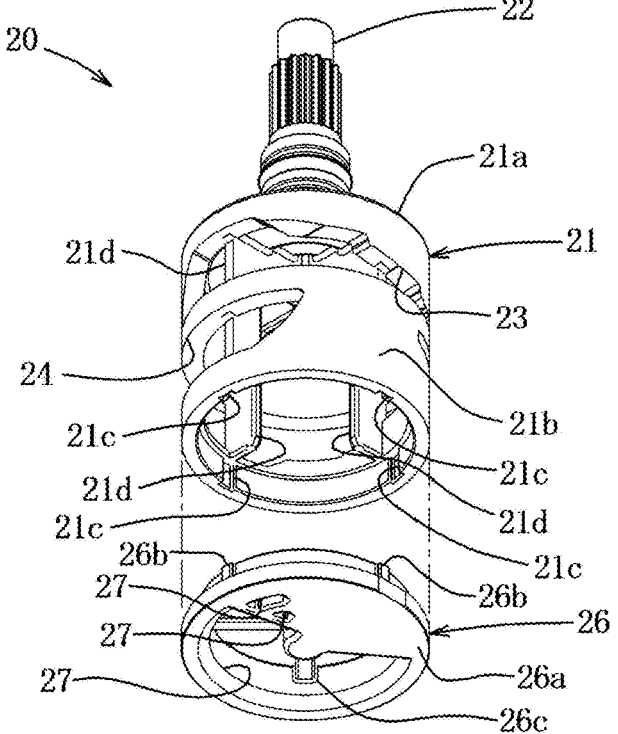
FIG. 5 is an exploded view of the valve body.

Next, the valve body 20 is described. As shown in FIG. 3 and FIG. 5, the valve body 20 is formed by fitting a disc-shaped second valve body 26 having a bottom surface portion 26a into the open end portion of a first valve body 21 having a cylindrical peripheral wall portion 21b and a top surface portion 21a. A plurality of key grooves 21c are formed on the inner periphery of the peripheral wall portion 21b of the first valve body 21. The second valve body 26 has a plurality of keys 26b corresponding to the plurality of key grooves 21c of the first valve body 21.

The plurality of key grooves 21c and the corresponding plurality of keys 26b prevent relative rotation between the first valve body 21 and the second valve body 26, as well as provide circumferential positioning, allowing the first valve body 21 and the second valve body 26 to turn integrally. The peripheral wall portion 21b slides against the inner peripheral surface surrounding the side surface of the cylindrically formed space inside the valve main body 11, and functions as a seal surface portion to close the first outlet 13 and the second outlet 14 of the valve main body 11. The bottom surface portion 26a functions as a seal surface portion to close the inlet 15 of the valve main body 11.

The first valve body 21 has a first opening portion 23 on the upper side (top surface portion 21a side) of the peripheral wall portion 21b to connect the internal space of the valve body 20 with the first outlet 13. This first valve body 21 has a second opening portion 24 on the lower side (open end portion side) of the peripheral wall portion 21b to connect the internal space of the valve body 20 with the second outlet 14. The first opening portion 23 and the second opening portion 24 are formed such that the axial opening widths (heights) thereof change respectively as they move in the circumferential direction. Further, the first valve body 21 has a plurality of reinforcement ribs 21d formed to protrude into the internal space to reinforce the peripheral wall portion 21b and the top surface portion 21a. These reinforcement ribs 21d suppress the radial and axial deformation of the first valve body 21.

The second valve body 26 has a plurality of third opening portions 27 to connect the internal space of the valve body 20 with the inlet 15. The bottom surface portion 26a has an annular outer peripheral portion and a fan-shaped portion connecting this annular outer peripheral portion with the central portion thereof, occupying substantially half of the projected area in the axial direction of the valve body 20. To suppress the deformation (axial displacement) of this bottom surface portion 26a, a plurality of reinforcement ribs 26c are radially formed on the bottom surface portion 26a on the side facing the internal space of the valve body 20, connecting the annular outer peripheral portion with the central portion thereof. The reinforcement ribs 26c are also formed in the third opening portions 27.

Figure 6:
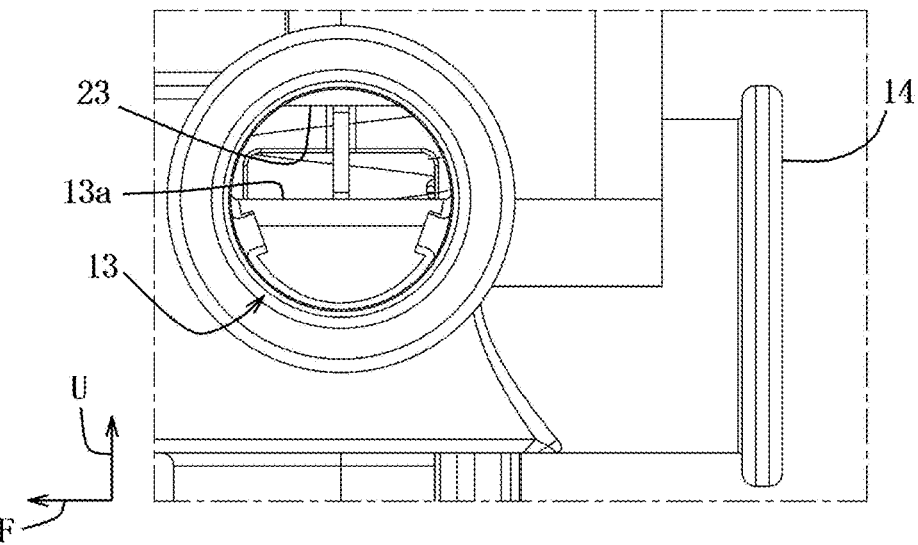
FIG. 6 is a diagram showing the opening of the first outlet of the distribution valve shown in FIG. 2.
Figure 7:
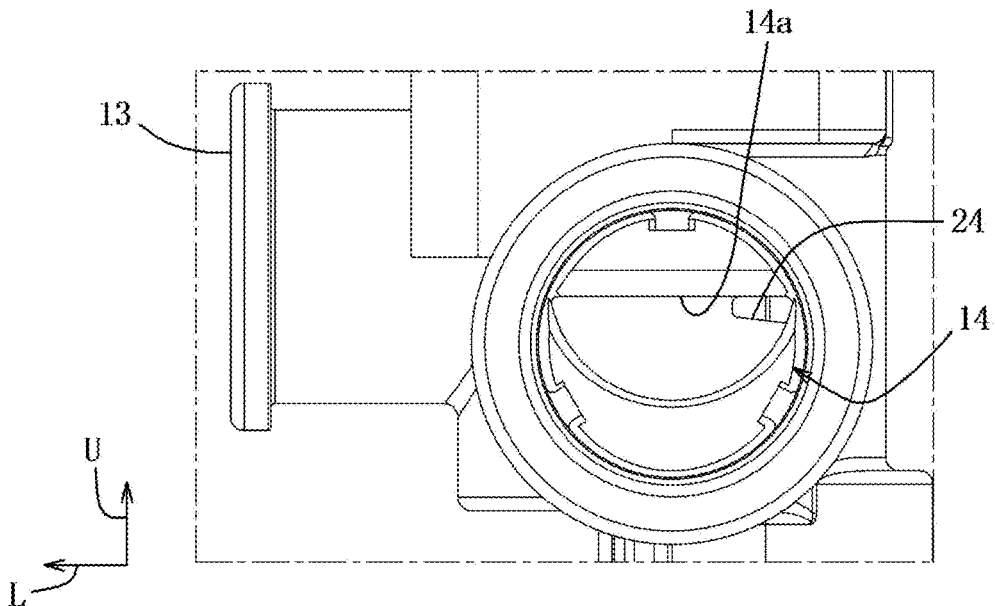
FIG. 7 is a diagram showing the opening of the second outlet of the distribution valve shown in FIG. 2.
Figures 8, 9:
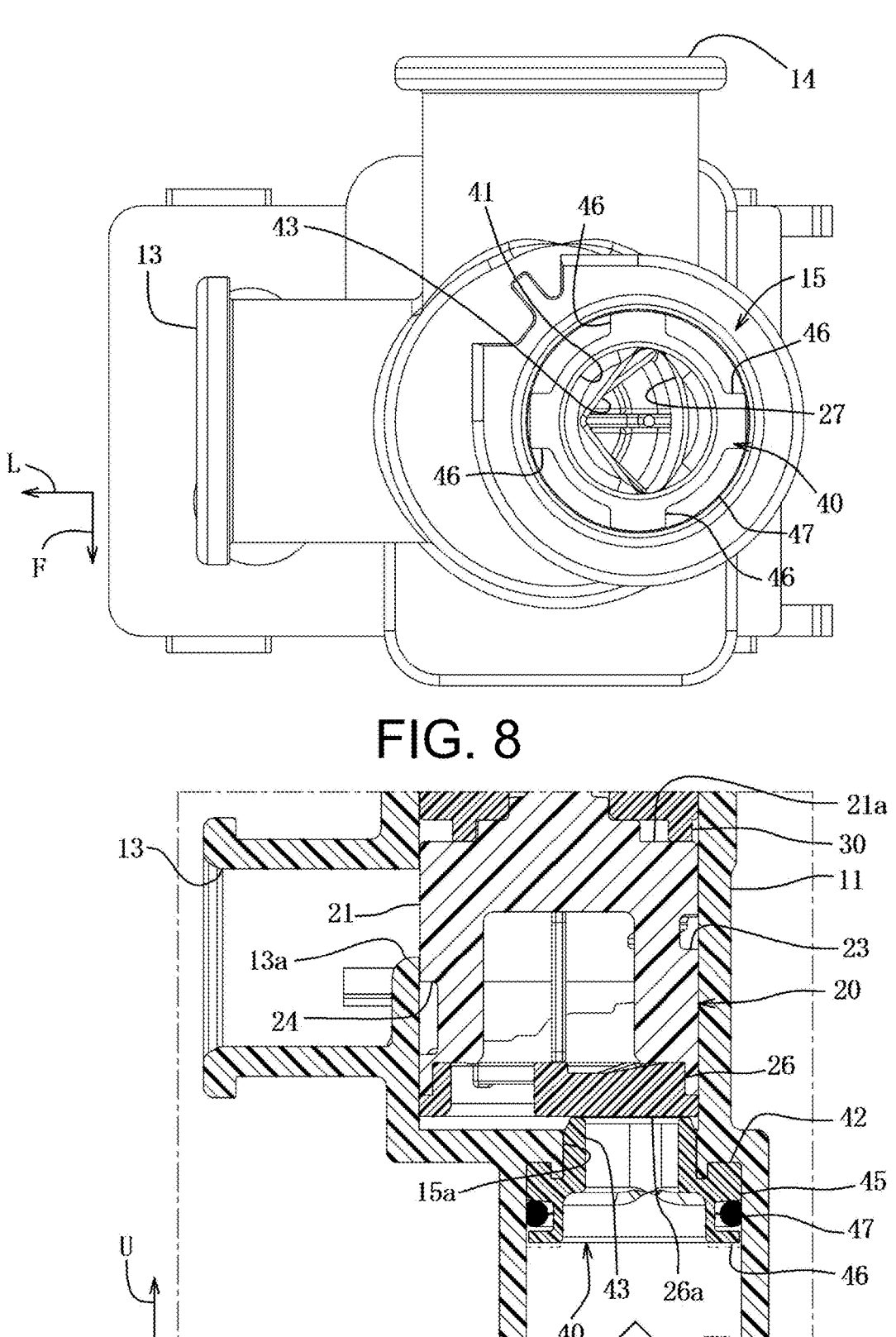
FIG. 8 is a diagram showing the opening of the inlet of the distribution valve shown in FIG. 2.
FIG. 9 is a vertical cross-sectional view of main parts of a distributor valve in a closed state.

As shown in FIG. 6, the first outlet 13 communicates with the internal space of the valve body 20 through a connecting portion 13a, which is opened in a semicircular shape with a straight lower end, and the first opening portion 23 of the valve body 20. Further, as shown in FIG. 7, the second outlet 14 communicates with the internal space of the valve body 20 through a connecting portion 14a, which is opened in a semicircular shape with a straight upper end, and the second opening portion 24 of the valve body 20. Then, as shown in FIG. 8, the inlet 15, to which the valve seat member 40 is mounted, communicates with the internal space of the valve body 20 through the inner side of the cylindrical portion 41 of the valve seat member 40, the fan-shaped inner side of the seal portion 43, and the third opening portion 27 of the valve body 20.

In response to the rotation of the valve body 20, the opening area of the first opening portion 23 communicating with the first outlet 13, the opening area of the second opening portion 24 communicating with the second outlet 14, and the opening area of the third opening portion 27 communicating with the inlet 15 continuously change within the respective predetermined ranges thereof. In this case, the initial state of the valve body 20 with a rotation angle of 0 degrees is defined as follows: as shown in FIG. 6, the opening area of the first outlet 13 is at the maximum thereof; as shown in FIG. 7, the opening area of the second outlet 14 is at the minimum thereof; and as shown in FIG. 8, the opening area of the inlet 15 is substantially at the maximum thereof. The predetermined ranges are from maximum to zero (closed) for the first outlet 13 and the inlet 15, and from a non-zero minimum to maximum for the second outlet 14, but these ranges may be appropriately adjusted as needed.

As the valve body 20 is rotated clockwise (when viewed from above) from the initial state thereof, the opening area of the first outlet 13 decreases, the opening area of the second outlet 14 increases, while the opening area of the inlet 15 is maintained at the maximum thereof. With further rotation, the opening area of the inlet 15 begins to decrease, the first outlet 13 is then closed, and the opening area of the second outlet 14 reaches the maximum thereof. Finally, for example, when rotated 260 degrees clockwise from the initial state, the first outlet 13 is closed, the opening area of the second outlet is maintained at the maximum thereof, and the inlet 15 is closed.

Regarding the tap water introduced from the inlet 13, in the initial state, the tap water distributed to the second outlet 14 on the heat exchanger 3 side is at the minimum thereof, and the majority is distributed to the first outlet 13 on the bypass passage 6 side. The valve seat member 40 moves in such a way that the seal portion 43 of the valve seat member 40 adheres to the bottom surface portion 26*a* of the valve body 20 due to the pressure of the flowing tap water, that is, the supply pressure of the tap water. As the valve body 20 is rotated clockwise, the tap water distributed to the first outlet 13 decreases while the tap water distributed to the second outlet 14 increases. In normal hot water supply of the hot water supply device 1, the distribution ratio is adjusted by rotating the valve body 20 in the region where an increase in one of the first outlet 13 and the second outlet 14 corresponds to a decrease in the other.

In cases where heating capacity tends to be insufficient, such as during high-temperature hot water supply, the valve body 20 is further rotated to reduce the tap water distributed to the first outlet 13 to zero, supplying all the tap water introduced from the inlet 13 to the second outlet 14. In the case where the heating capacity is insufficient due to a large total flow rate, the valve body 20 is further rotated to decrease the opening area of the inlet 15, thereby regulating the introduction of tap water and reducing the total flow rate.

In the case where the hot water supply device 1 is one of the hot water supply devices constituting a linked hot water supply system and corresponds to a hot water supply device that is not in operation, the valve body 20 is rotated to close the inlet 15, reducing the total flow rate to zero. At this time, as shown in FIG. 9, the valve seat member 40 is pressed in by the supply pressure of the tap water supplied to the inlet 15 as indicated by the arrow WI, maintaining the state where the seal portion 43 adheres to the bottom surface portion 26*a* of the valve body 20, preventing the inflow of tap water into the valve main body 11. Leakage from the outer periphery of the valve seat member 40 is suppressed by the O-ring 47. Thus, since the distribution valve 10 possesses a total flow rate adjustment function and a closing function to reduce the total flow rate to zero, in addition to the fluid distribution function, it is possible to omit the flow rate adjustment valve that is normally equipped and the stop valve equipped for the linked hot water supply system.

The following describes the action and effects of the aforementioned distribution valve 10. The distribution valve 10, which distributes fluid flowing from the inlet 15 into the valve body 20 to the first outlet 13 and the second outlet 14, includes a cylindrical valve body 20 rotatably fitted into the valve main body 11, and a drive unit 12 (driver) that rotates the valve body 20. The valve body 20 has a peripheral wall portion 21*b* that functions as a seal surface portion closing the first outlet 13 and the second outlet 14, and a bottom surface portion 26*a* that functions as a seal surface portion closing the inlet 15. The peripheral wall portion 21*b* is formed with a first opening portion 23 and a second opening portion 24 that continuously change the opening areas of the first outlet 13 and the second outlet 14 according to the rotation of the valve body 20. The bottom surface portion 26*a* is formed with a third opening portion 27 that changes the opening area of the inlet 15 within a predetermined range according to the rotation of the valve body 20.

The inlet 15 is provided with a valve seat member 40 having a seal portion 43 that seals by contacting the bottom surface portion 26*a* of the valve body 20. This valve seat member 40 is movable in the axial direction of the valve body 20 and is pressed so that the seal portion 43 adheres to the bottom surface portion 26*a* of the valve body 20 in response to the supply pressure of the fluid. Thus, when the valve body 20 is rotated to close the inlet 15, the seal portion 43 of the valve seat member 40 adheres to the bottom surface portion 26*a* of the valve body 20, preventing leakage and enabling water stoppage. Further, for example, even if the seal portion 43 wears due to the rotation of the valve body 20, the valve seat member 40 may move towards the valve body 20, causing the seal portion 43 to adhere to the bottom surface portion 26*a* of the valve body 20, thereby maintaining the closing function.

The valve seat member 40 has an O-ring 47 on the outer peripheral portion thereof that seals between the inner peripheral surface of the inlet 15. Thus, it is possible to seal the fluid that enters between the inner peripheral surface of the inlet 15 and the valve seat member 40, enabling the valve seat member 40 to be pressed towards the valve body 20.

The distribution valve 10 is applicable to devices other than the hot water supply device 1, and may be used for distribution of fluids other than tap water. Furthermore, those skilled in the art may implement various modification examples to the aforementioned embodiment without departing from the spirit of the disclosure, and the disclosure encompasses such modification examples.

What is claimed is:

1. A distribution valve, comprising:
   a valve main body, having a first outlet, a second outlet, and an inlet;
   a cylindrical valve body, rotatably fitted into the valve main body; and
   a driver, configured to rotate the valve body,
   wherein the valve body comprises a peripheral wall portion that functions as a sealing surface portion that closes the first outlet and the second outlet, and a bottom surface portion that functions as a sealing surface portion that closes the inlet, the peripheral wall portion is formed with a first opening portion and a second opening portion configured to continuously change an opening area of the first outlet and an opening area of the second outlet by rotation of the valve body, the bottom surface portion is formed with a third opening portion configured to change an opening area of the inlet within a predetermined range by rotation of the valve body, and the distribution valve distributes a fluid flowing into the valve body from the inlet to the first outlet and the second outlet, wherein a valve seat member provided with a seal portion that seals by contacting the bottom surface portion is arranged in the inlet, and the valve seat member is movable in an axial direction of the valve body, and is configured such that the seal portion adheres to the bottom surface portion as the valve seat member is pressed toward the valve body by a supply pressure of fluid acting on the inlet.

2. The distribution valve according to claim 1, wherein an O-ring is provided on an outer peripheral portion of the valve seat member for sealing between the valve seat member and an inner peripheral surface of the inlet.

* * * * *